UNITED STATES PATENT OFFICE.

RUSSELL WILES, OF RIVERSIDE, ILLINOIS.

FOOD PRODUCT.

1,212,722.     Specification of Letters Patent.     Patented Jan. 16, 1917.

No Drawing.     Application filed December 26, 1914. Serial No. 879,103.

*To all whom it may concern:*

Be it known that I, RUSSELL WILES, a citizen of the United States, residing at Riverside, in the county of Cook and State of Illinois, have invented a new and useful Food Product, of which the following is a specification.

My invention consists in a new food product and method for producing the same.

It is well known that fermented malt liquors, like beer, contain, besides alcohol and water, a considerable quantity of readily digestible food, partly in the form of proteids and partly in the form of maltose, in addition to certain valuable tonic materials. There is, however, a wide-spread objection to the use of such liquors because of their alcoholic content, and efforts to produce non-alcoholic substitutes, especially for beer, have been very frequent. These efforts, however, have usually resulted either in a product with an undesirable taste, due to changes in the remaining ingredients produced on them by removing the alcohol, or else in a product more like malt-extract than beer, *i. e.*, a product high in maltose and of a sweet taste. Efforts have also been made to produce a concentrated syrup or solution which could be diluted with carbonated water, as in dispensing soda water, to produce a drink having a true beer flavor. Such efforts have failed, partly because of the inherent difficulties of concentrating even malt extract without fundamentally changing the flavor, and partly because the cencentrated syrup spoils readily, and is not easily pasteurized without fundamental changes in its flavor. It has been demonstrated, however, that the most complex substances can be treated by modern desiccating methods and instantly reduced to a dry powder, and will undergo no substantial chemical alteration in the process. In such methods the liquid is reduced to the finest possible droplets by spraying under a very high pressure into a desiccating atmosphere. The droplets are so very small that the spray has the appearance of fog or mist, and the liquid content evaporates so quickly and over such an enormous surface, that the solid content is dried before it reaches a high enough temperature, or remains long enough at such temperature, to substantially change its composition. Even the albumens of milk do not coagulate, and the complex enzyms of malt are known to be attainable in a dry state substantially unaffected by the desiccating process when it is properly performed.

My process consists in taking a fermented malt beverage, as beer, which has the characteristic relatively low sugar content, and is practically free from the diastases of the malt; and which contains the usual normal proteins and other contents of such beverages, and in spraying the liquid in the form of extremely fine droplets into a desiccating atmosphere, whereby the particles are instantly dried, and collecting the dried particles thus formed. A part of the alcohol can, of course, be conveniently collected by fractional condensation and form a valuable by-product.

The powder resulting from my process has substantially the full food and tonic value of the beverage from which it was made, the sugar is not appreciably, if at all, caramelized, and the proteids and other solids have not appreciably changed. It is soluble in water to make a concentrated solution for subsequent dilution with carbonated water, or can be dissolved in carbonated water in the first instance if preferred. The first method of use is probably most convenient, because of the ease of dispensing; although in practice it will probably be most desirable to vend the dried powder so that the concentrated solution can be made up fresh at such intervals as not to spoil before it is dispensed.

What I claim as new and desire to secure by Letters Patent, is:

The herein described water-soluble dry food powder consisting of the solid constituents of fermented malt liquor in the quantity and relative proportions which they bear to each other in such liquor, such solid constituents being chemically substantially unchanged, whereby a water solution of the powder, when carbonated, has substantially the original properties of the fermented liquor except for the alcohol content.

RUSSELL WILES.

In presence of —
  F. M. RONDEAU,
  O. C. AVISUS.